Nov. 15, 1949  P. C. SHERBURNE  2,487,989
EYE BOLT
Filed Aug. 20, 1945
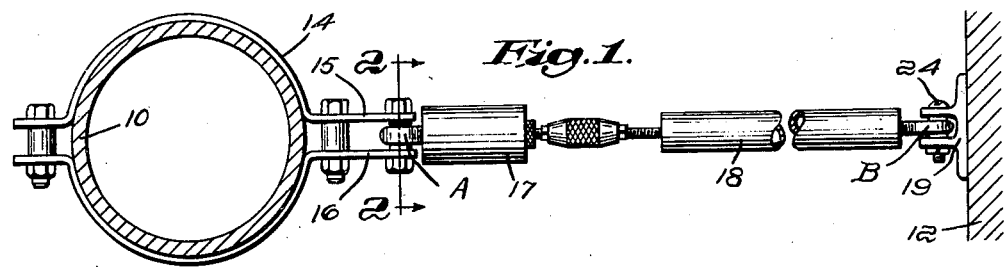
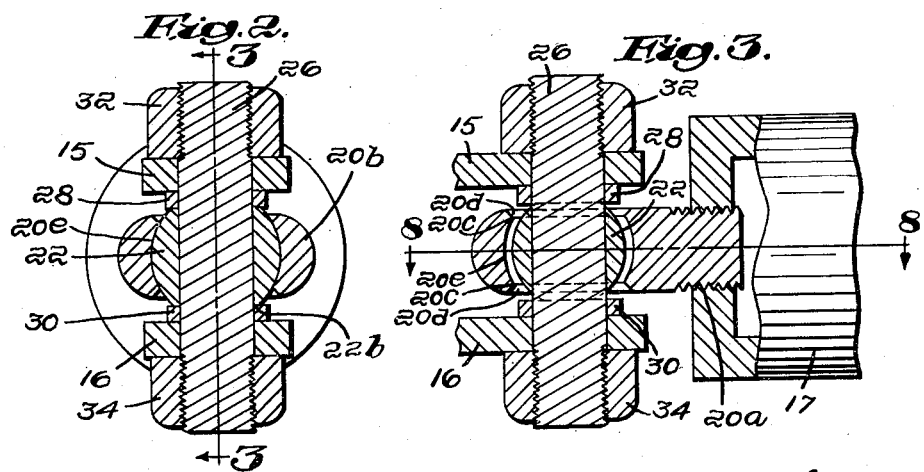
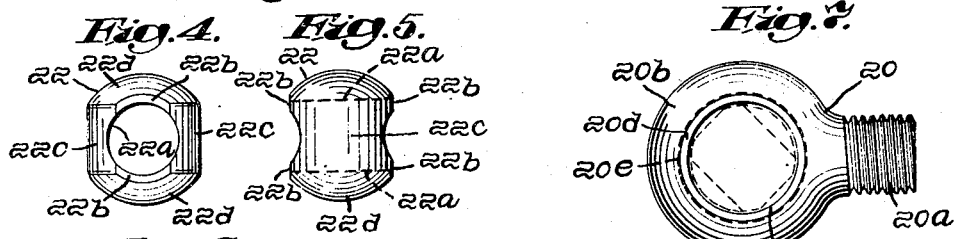
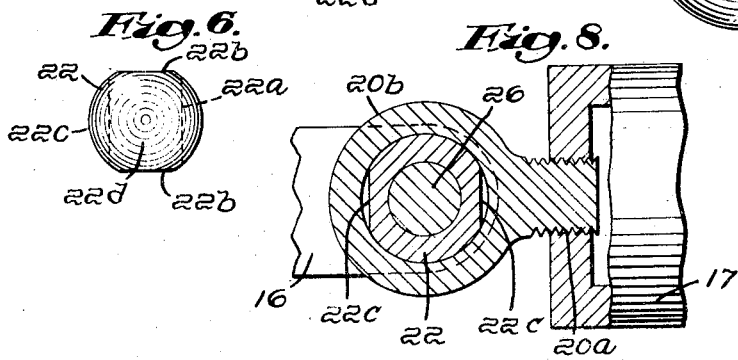
Philip C. Sherburne, Inventor:
by Harry Dexter Pick
Attorney Patented Nov. 15, 1949

2,487,989

UNITED STATES PATENT OFFICE 2,487,989

EYE BOLT

Philip C. Sherburne, Warwick, R. I., assignor to Grinnell Corporation, Providence, R. I., a corporation of Delaware Application August 20, 1945, Serial No. 611,592

4 Claims. (Cl. 287—88)

This invention relates to improvements in eye bolts. More especially it has to do with an eye bolt having a socket and a ball-like member therein adapted to receive a shaft, the combination providing a limited range of universal movement between the eye bolt and the shaft.

When the ordinary eye bolt is connected to a shaft there is hardly more than a line-to-line contact between the two. This gives rise to a tendency both to shear and to bend. Not infrequently there is ample opportunity for the eye bolt to shift along the shaft and usually the open eye of the bolt is so much larger than the shaft that in the event of a change in direction of the forces acting, such as may be described as a change from a pull to a push, there is excessive lost motion. This may lead to failure of either the bolt or the shaft if the shift or taking up of the slack occurs with considerable intensity.

It is an object of this invention to provide an eye bolt with a socket and ball-like member which can be used with a shaft so that there will be appreciable surface contact for distribution of the forces acting, so that there will be no undesired shifting between the shaft and bolt either along the shaft or in any other direction, and so that there will be no material change in the relation of the parts if the direction of the forces acting is reversed. A feature of the improved device is that both the ball and socket members are each made as a single integral piece. It is a further feature of the improved device that it may embody its own shaft and thus provide for various forms of connections with other apparatus or structure.

The best mode in which I have contemplated applying the principles of my invention is shown in the accompanying drawings but these are to be taken as illustrative for it is intended that the patent shall cover by suitable expression in the appended claims whatever features of patentable novelty exist in the invention disclosed.

In the drawings:

Fig. 1 is an elevation showing a pair of my improved eye bolts in a sway brace connection between a fixed wall and a movable pipe line;

Fig. 2 is an elevation in section, as on line 2—2 of Fig. 1;

Fig. 3 is another elevation in section taken as on line 3—3 of Fig. 2;

Figs. 4, 5 and 6 are views of the ball-like element;

Fig. 7 is a view of the bolt with the ball-like member shown in dotted outline; and Fig. 8 is a plan in section, taken as on line 8—8 of Fig. 3.

Referring now to the drawings and particularly to Fig. 1, a pipe 10 is representative of any element which is subject to influences which tend to cause it to move either way along its own longitudinal axis, or upward or downward, or toward or from a fixed element such as a wall 12, or in any combination or resultant of these several directions. As here shown, a clamp 14 is attached to the pipe with its strap ends 15 and 16 engaging my improved eye bolt A. The latter is secured to a sway brace 17, such as is disclosed in Letters Patent 2,372,214 granted March 27, 1945, and the brace in turn is connected by a tubular element 18 to another of my eye bolts B. The latter completes the sway connection with a bracket 19 secured to the wall 12.

Turning now to Fig. 7, my improved bolt 20 has the usual threaded shank 20a and the customary loop 20b except that the inner surface of the loop is spherically shaped to receive a ball-like member 22, shown in Figs. 4, 5 and 6. This ball member has an axial hole 22a through it to receive a shaft. The portions at the ends of this hole are flattened to provide opposed flat bearing surfaces 22b perpendicular to the axis of the hole. The surfaces 22c extending around the ball from one end of the hole to the other end thereof are cylindrical with the axis of both cylindrical surfaces perpendicular to the axis of the hole at its midpoint. The remaining surface portions 22d of the ball are truly spherical. In other words the ball-like member 22 may be said to be a sphere-like member having opposed spherically shaped surface portions 22d separated by cylindrically shaped surface portions 22c forming an equatorial zone about the sphere.

The diameter of the inner edges 20c of the side openings into the eye of the bolt is slightly larger than the diameter through the ball between the cylindrical surfaces 22c, so that the ball can be inserted in the eye as indicated in dotted outline in Fig. 7. From these inner edges 20c of the loop (See Fig. 3) short beveled or chamfered surfaces 20d extend outward to the surface of the loop. Between the inner edges 20c, the inside surface 20e of the eye is spherical and of substantially the same diameter as the diameter between the spherical surfaces of the ball. Thus when the ball is placed within the loop and then rotated therein to bring its hole more or less parallel with the axis of the eye opening, the ball is centered in the loop with its spherical surfaces in sliding contact with the spherical surface of the eye bolt.

With the ball suitably positioned in the eye, a shaft of approximately the same diameter as that of the hole 22a in the ball can be inserted therethrough. Such shaft may be a part of some element that is to be connected with the eye bolt or it may be a pin, such as shown at 24 in Fig. 1. In the arrangement shown in the drawings, a shaft 26 is provided having spacing collars 28 and 30 on opposite sides of the ball 22 between it and the arms 15 and 16 of the pipe clamp 14. These collars rest against the flat bearing surfaces 22b. Outside these arms nuts 32 and 34 are screwed onto the ends of the shaft.

One of the advantages of the improved eye bolt with socket and ball is that it compactly provides a free universal movement within a limited scope between the eye bolt and a shaft. Another is that because the shaft makes a reasonably close fit within the ball there is no slap or lost motion between the shaft and eye bolt. This feature is particularly advantageous where the direction of force transmited from the shaft to the eye bolt may be changed in direction, as for example, where the improved bolt is used in a sway brace connection as illustrated in Fig. 1, or when used as a part of a trailer hitch on a vehicle. The chamfered or beveled surfaces 20d around the eye give greater latitude of movement for the ball than if they were merely cylindrical surfaces extending outward from the edges 20c. Still another advantage is that the confining of the shaft within the ball practically eliminates any tendency of the shaft to bend and so there is only the tendency to shear to be considered. And this tendency is materially lessened by the fact that the bearing between the shaft and the ball and between the latter and the eye is between surface and surface with a consequent reduction of intensity of applied forces. By suitable choice of spacing collars, the tendency of the eye bolt to shift along the shaft can be reduced to any extent desired. Since the ball is in effect always centered within the loop of the eye bolt, the force transmitted through the latter can be applied vertically, horizontally or at any angle within the range of movement of the shaft with respect to the eye bolt.

I claim:

1. An eye bolt having a loop with circular openings and with its inner surface between said openings spherically shaped, and an integral sphere-like member having opposed spherically shaped surface portions separated by cylindrically shaped surface portions forming an equatorial zone about the member; the diametrical dimension of said zone being substantially equal to the diametrical dimension of the openings of said loop to permit insertion of the said member within said loop and its removal therefrom, the said spherically shaped surface portions of said member engaging the spherically shaped surface of the loop upon rotation of the said member after its insertion in said loop, and the said member having a cylindrical hole with its axis perpendicular to the axis of the said cylindrically shaped surface portions.

2. An eye bolt comprising a loop forming an eye and having a spherically shaped inner surface, and an integral ball-like member insertable in and removable from said eye and having spherically shaped surface portions on opposite sides thereof; the said member having a cylindrical hole and having cylindrically-shaped surface portions extending on opposite sides between the said spherically shaped surface portions.

3. An eye bolt having a loop forming an eye with parallel circular edges and an inner concave spherically shaped surface between said edges, and an integral ball-like member having an axial hole, having opposed cylindrically-shaped surface portions on opposite sides of the member extending between the edges of said hole, and having convex spherically shaped surface portions on opposite sides of the member extending between the edges of said cylindrically shaped surface portions; the said cylindrically shaped surface portions having a diametrical dimension slightly smaller than the diametrical dimension of the said circular edges of the eye, whereby the said member can be inserted within the eye and then rotated to bring the spherically shaped surface portions of the member in bearing contact with the spherically shaped surface of the said loop.

4. An eye bolt consisting of a loop forming an eye and having its inner surface spherically shaped, and an integral ball-like member insertable and removable through said eye; the said member having a central hole therethrough and having opposed spherically shaped surface portions disposed with the axis through the center points thereof perpendicular to the axis of said hole, and said member also having cylindrically shaped surface portions with the axis of rotation thereof coincident with the said axis of the said spherically shaped surface portions; the said cylindrically shaped surface portions having a diameter substantially equal to that of said eye whereby said member can be inserted in said eye with the said axis of the cylindrically shaped surface portions in alignment with the axis of said eye and then turned through an angle of ninety degrees to bring the spherically shaped surface portions of said member into bearing contact with the spherically shaped surface of said loop and with the axis of said hole coincident with the axis of said eye.

PHILIP C. SHERBURNE.

REFERENCES CITED

The following references are of record in the file of this patent:

UNITED STATES PATENTS

| Number | Name | Date |
|---|---|---|
| 2,309,281 | Steele | Jan. 26, 1943 |
| 2,384,095 | Keahey | Sept. 4, 1945 |